US012380656B2

(12) United States Patent
Peram

(10) Patent No.: US 12,380,656 B2
(45) Date of Patent: Aug. 5, 2025

(54) SYSTEM FOR AUGMENTED REALITY IN A PORTABLE COMPUTING DEVICE

(71) Applicant: US TECHNOLOGY INTERNATIONAL PRIVATE LIMITED, Kerala (IN)

(72) Inventor: Venkata Narendra Peram, Hyderabad (IN)

(73) Assignee: US TECHNOLOGY INTERNATIONAL PRIVATE LIMITED, Thiruvananthapuram (IN)

( * ) Notice: Subject to any disclaimer, the term of this patent is extended or adjusted under 35 U.S.C. 154(b) by 112 days.

(21) Appl. No.: 18/073,287

(22) Filed: Dec. 1, 2022

(65) Prior Publication Data

US 2024/0013491 A1 Jan. 11, 2024

(30) Foreign Application Priority Data

Jul. 8, 2022 (IN) .............................. 202241039382

(51) Int. Cl.
*G06T 19/00* (2011.01)
*G06F 1/16* (2006.01)
*G06F 9/451* (2018.01)

(52) U.S. Cl.
CPC .......... *G06T 19/006* (2013.01); *G06F 1/1613* (2013.01); *G06F 9/452* (2018.02)

(58) Field of Classification Search
None
See application file for complete search history.

(56) References Cited

U.S. PATENT DOCUMENTS

| 10,681,225 | B1 * | 6/2020 | Rao ....................... G06F 3/0426 |
| 2019/0043262 | A1 * | 2/2019 | Anderson .......... G02B 27/0172 |
| 2020/0219322 | A1 * | 7/2020 | Verma ..................... G06T 11/00 |
| 2020/0374250 | A1 * | 11/2020 | Le Strat ................ H04L 67/306 |
| 2022/0311979 | A1 * | 9/2022 | Wexler ................. G06V 40/172 |

* cited by examiner

*Primary Examiner* — Yi Wang
(74) *Attorney, Agent, or Firm* — NIXON PEABODY LLP; Jeffrey L. Costellia

(57) ABSTRACT

A portable computing device for projecting augmented reality is provided.
The portable computing device may include a plurality of projection sub-systems configured to project at least one input device, at least one output device. The portable computing device may include a processor in communication with the plurality of projection sub-systems and configured to establish a connection between the portable computing device and a remote server. The processor is configured to determine that one of the plurality of projection sub-systems has been connected to the remote server; and communicate a data between the portable computing device and the remote server.

6 Claims, 5 Drawing Sheets

SYSTEM FOR AUGMENTED REALITY IN A PORTABLE COMPUTING DEVICE

FIELD OF THE INVENTION

The present subject matter relates generally to a mobile computing device, more particularly, to a device and system of a cloud personal computer with augmented reality.

BACKGROUND

Information technology has deeply rooted in all areas of our lives. A person may hardly imagine himself without portable electronic devices such as a smartphone, a computer, a laptop, etc. The era of portable devices, such as laptops, smartwatches has arrived and it's not surprising. However, with advent of sophisticated technology both in terms of software and hardware, the currently used laptops also looks challenging in terms of handling. Due to the multiple functional parts such as screen, keyboard, may be an additional tracking ball device, the laptops may be inconvenient to carry as backpack everywhere. Moreover, the functional parts are more prone to damage while carrying. Such problems may aggravate when a user is unable to procure the new parts to replace the broken functional parts. This may lead to creation of electronics waste and loss of productive time and effort of the user.

The touchpad devices such as tablets, began with a journey to replace laptops. However, users may have inconvenience in handling the keyboard, or other functional utilities on a limited screen size. The smartwatches also on parallel track fall short of providing facilities with the same breath that of the laptop.

Therefore, there is a need to develop a personal computer device which is convenient for the user to carry, with less functional parts.

There is a need for a solution to overcome the above-mentioned drawbacks.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure a system for providing augmented reality in a portable computing device is provided. The system includes a remote server configured to communicate with the portable computing device. The system includes a plurality of projection sub-systems in communication with the portable computing device and configured to project at least one input device, at least one output device. The system includes a processor in communication with the plurality of projection sub-systems and configured to establish a connection between the portable computing device and the remote server; determine that the plurality of projection sub-systems has been connected to the remote server; and communicate a data between the portable computing device and the remote server.

In an embodiment of the present disclosure a portable computing device is provided. The portable computing device includes a plurality of projection sub-system configured to project at least one input device, at least one output device. The portable computing device includes a processor in communication with the plurality of sub-systems and configured to establish a connection between the portable computing device and a remote server. The processor is configured to determine that one of the plurality of projection sub-systems has been connected to the remote server based on the connection and communicate a data between the portable computing device and the remote server.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

The present disclosure will become better understood when the following detailed description is read with reference to the accompanying drawings in which like characters represent like parts throughout the drawings, wherein.

DETAILED DESCRIPTION

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

The present disclosure relates to a portable computing device configured to provide an infrared or a laser augmented input devices, output devices for connecting to a virtual desktop infrastructure. The portable computing device may have processing capabilities to provide a user with seamless experience equivalent to using a laptop or a desktop.

Figure 1:
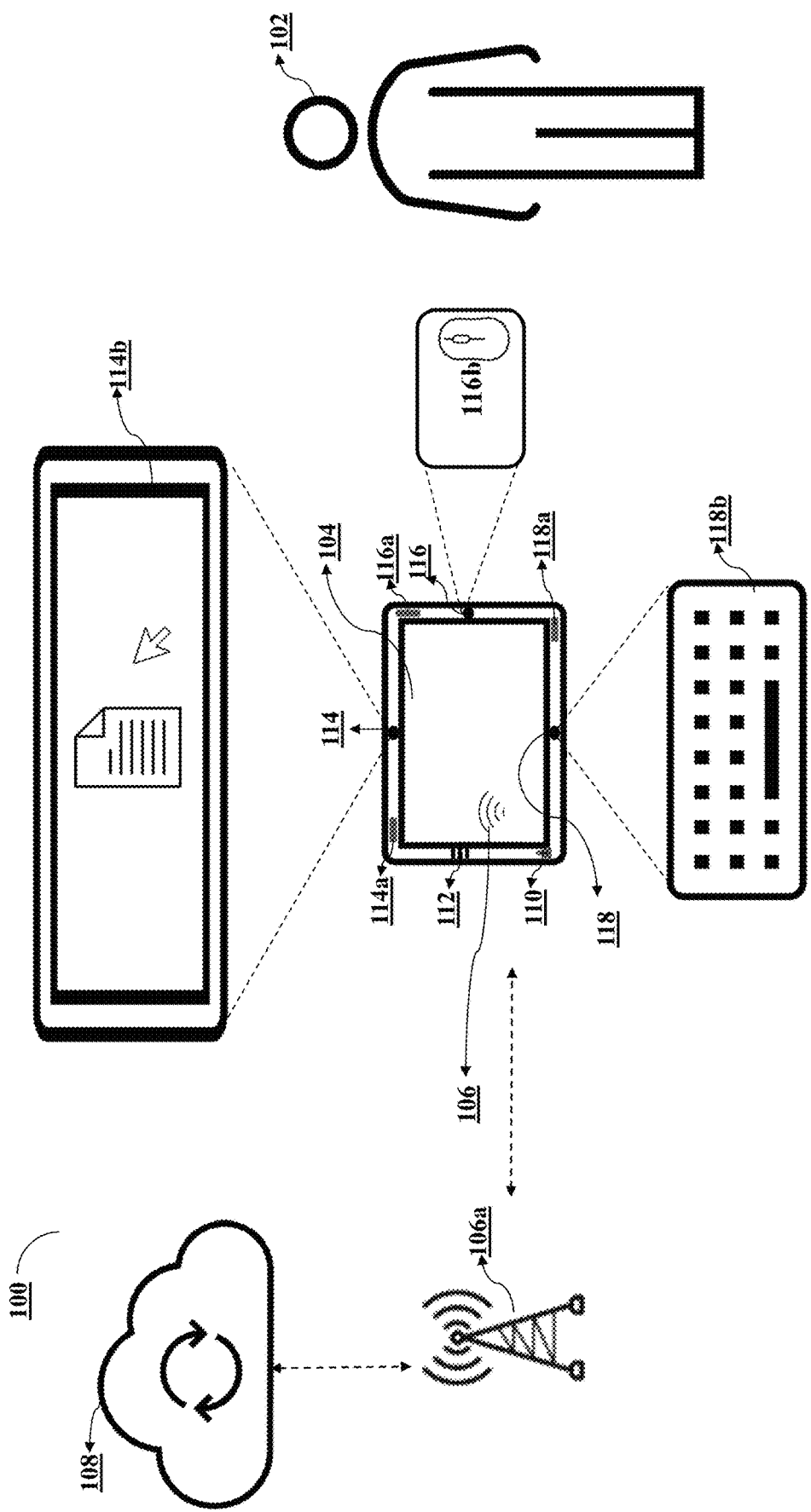
FIG. 1 illustrates an environment for the implementation of a system for providing augmented reality in a portable computing device in accordance with an embodiment of the present disclosure.

FIG. 1 illustrates an environment for the implementation of a system 100 for providing augmented reality in a portable computing device 104 in accordance with an embodiment of the present disclosure. For the sake of readability, the system 100 for providing augmented reality in the portable computing device 104 may hereinafter interchangeably be referred to as the system 100. In an embodiment, the system 100 may be operated by a user 102.

The system 100 may include but not limited, the portable computing device 104 being operated by the user 102 to connect through wireless connection 106 to a remote server 108. Particularly, the user 102 may be able to operate the portable computing device 104 for connecting to the virtual desktop infrastructure (VDI) in form of the remote server 108. The portable computing device 104 may be configured with wireless 106 mode to provide wireless connection for connecting to the VDI.

In an embodiment, the portable computing device 104 of the system 100 may include a projection sub-system. The projection sub-system may be configured to project an input device and an output device. The user 102 may be able to interact with the projection sub-system to operate the portable computing device 104 and thus exchange a connection between the portable computing device 104 and the remote server 108. The established wireless connection may provide communication of a data between the portable computing device 104 and the remote server 108, wherein the remote server 108 is the VDI.

In an example, the projection sub-system may be categorized as an input projection sub-system and as an output projection sub-system. In the example, the projection sub-system may be configured to project an infrared or a laser projection of the input sub-system and as an output sub-system.

In an embodiment, the portable computing device 104 of the system 100 may include but not limited, a switch 110 to toggle to on/off the portable computing device 104. The portable computing device 104 may include a charging port 112 configured to receive external power. The portable computing device 104 may include a screen projector 114 configured for projecting the infrared or the laser augmented reality screen 114b. The screen projector 114 may be switched on/off using an on/off augmented reality screen projector switch 114a. The portable computing device 104 may include a touch pad sensor projector 116 configured for projecting the infrared or the laser augmented touch pad sensor 116a. The touch pad sensor projector 116 may be switched on/off using an on/off infrared or laser augmented reality touch pad switch 116a. The portable computing device 104 may include a keyboard sensor projector 118 configured for projecting the infrared or the laser augmented keyboard sensor 118a. The keyboard sensor projector 118 may be switched on/off using an on/off infrared or laser augmented reality keyboard sensor projector switch 118a.

The user 102 may be able to operate the portable computing device 104 for projecting the infrared or the laser augmented reality screen, keyboard sensor and the touchpad sensor. The user 102 may position the portable computing device 104 on flat surface such that the infrared, or the laser augmented reality projections may be projected on hard surface. Thus, the user may be able to operate the infrared, or the laser augmented touchpad 116b and the keyboard sensor 118b. Similarly, the infrared, or the laser augmented reality screen 114b may be projected on the surface such as a wall for easy viewability.

Figure 2:
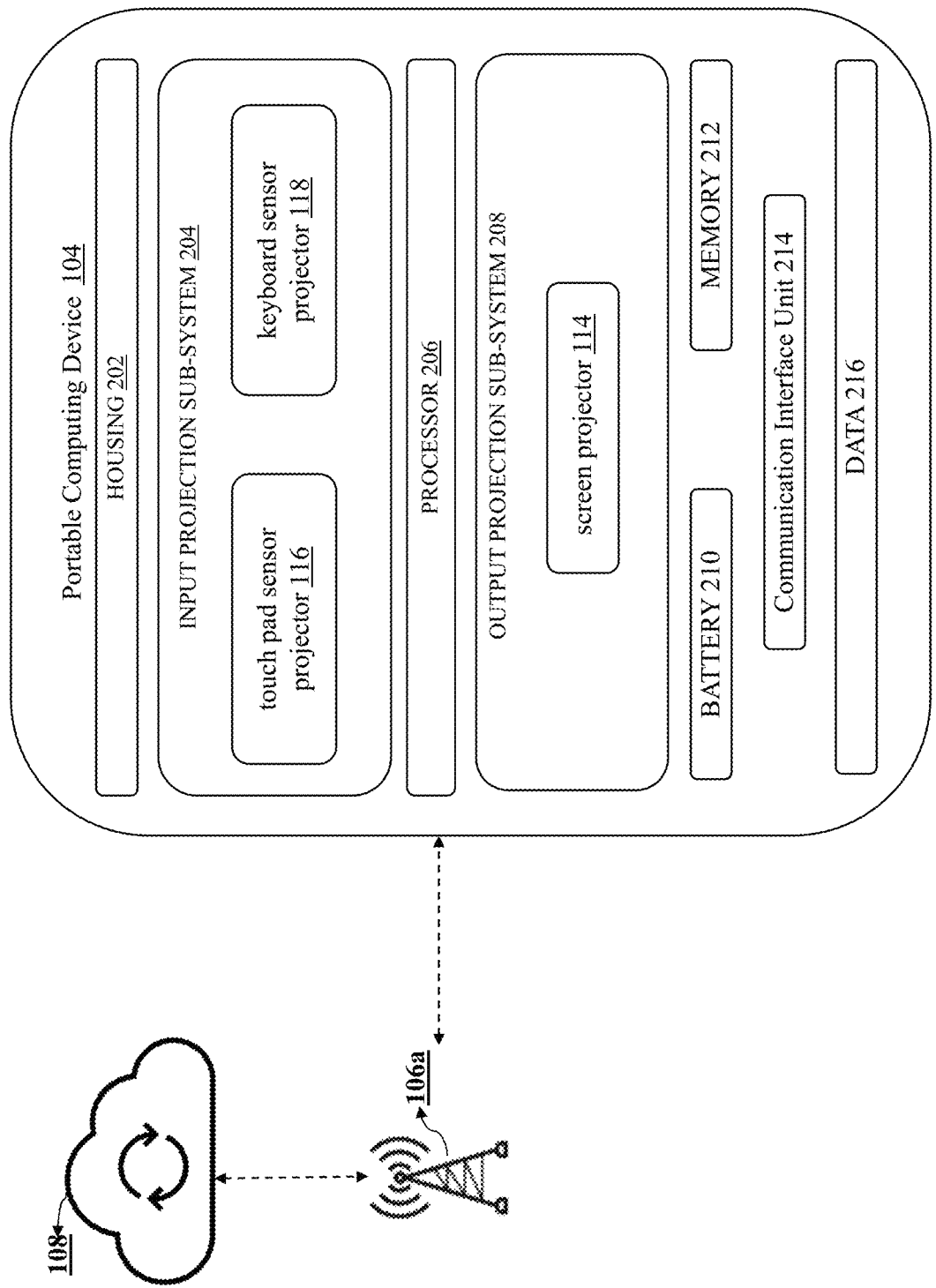
FIG. 2 illustrates a block diagram of the portable computing device in accordance with an embodiment of the present disclosure.

FIG. 2 illustrates a block diagram of the portable computing device 104 in accordance with an embodiment of the present disclosure.

The portable computing device 104 may include a housing 202, the input projection sub-system 204 disposed on the housing 202, a processor 206 in communication with the input sub-system 204, the output projection sub-system 208 configured to provide information related to the remote server 108. In an embodiment, the input projection sub-system 204, the processor 206, and the output projection sub-system 208 may be communicatively coupled with each other through a bus (not shown). The input projection sub-system 204 may be configured to receive an input from the user 102, which is then processed by the processor 206 before being transmitted to the output projection sub-system 208 as a display.

The processor 206 may be a single processing unit or several units, all of which could include multiple computing units. The processor 206 may be implemented as one or more microprocessors, microcomputers, microcontrollers, digital signal processors, central processing units, state machines, logic circuitries, and/or any devices that manipulate signals based on operational instructions. Among other capabilities, the processor 206 may be configured to fetch and execute computer-readable instructions and data stored in a memory 212.

The memory 212 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The portable computing device 104 may also include data 216 that serves, amongst other things, as a repository for storing data processed, received, and generated by the aforementioned components/units.

Further, the input projection sub-system 104 may include, but is not limited to, the touch pad sensor projector 116 and the keyboard sensor projector 118 being disposed on the housing 202 of the portable computing device 104. The touch pad sensor projector 116 may be configured to project the infrared, or the laser augmented reality touch pad sensor 116b, such that the user 102 may interact with the touch pad sensor 116b to provide input. The touch pad sensor 116b may be representative of a pointing device that detects two-dimensional motion of the user 102 relative to a surface. This motion is typically translated into the motion of a pointer on a display, which allows a smooth control of the graphical user interface of the portable computing device 104. The keyboard sensor projector 118 may be configured to project the infrared, or the laser augmented reality keyboard sensor 118b, such that the user 102 may interact with the keyboard sensor 118b to provide input. The keyboard sensor 118b may be representative of a form of computer input device whereby the image of virtual keyboard is projected onto a surface. When the user 102 touches the surface covered by an image of a key, the portable computing device 104 may be configured to record the corresponding keystroke. The keyboard sensor projector 118 includes the laser or beamer that may project the keyboard sensor 118*b* onto a flat, smooth surface. The portable computing device 104 may include sensor configured to identify keypresses on the keyboard sensor 118*b*. When the user 102 tap a virtual key, the sensor may identify this command and the corresponding program converts it into the appropriate action or response.

The processor 206 may be adapted to receive the data from the infrared, or the laser augmented reality touch pad sensor 116*b* and the infrared, or the laser augmented reality keyboard sensor 118*b*. Based on the received data and a user instruction, the processor 206 may be adapted to generate information for being shared with the user 102. The generated information may be provided to the user 102 through the output projection sub-system 208.

The output projection sub-system 208 may be configured to include at least the infrared, or the laser augmented reality screen projector 114. The infrared, or the laser augmented reality screen projector 114 may be configured to provide the display to the user 102 indicative of the generated information. For an instance, the screen projector 114*b* using the infrared or the laser may use projectors to overlay augmented reality (AR) content directly over real-life objects using projection mapping techniques. This allows the user 102 to view AR content with their naked eyes without needing any external head-mounted AR glasses or handheld AR-enabled devices.

The portable computing device 104 may also include a battery 210 adapted to provide operating power to the input projection sub-system 204, the processor 206, and the output projection sub-system 208. The battery 210 may represent single or individual cell or a battery pack comprising of any number of identical cells.

In an embodiment, the portable computing device 104 may include a communication interface unit 214 adapted to enable communication with one or more further remote server 108 over the network 106*a*. The network can be a wired network or a wireless network. Examples of the wireless network may include, but are not limited to, a cloud-based network, a Wi-Fi® network, a WiMAX® network, a Wireless Local Area Network (WLAN), fifth generation mobile network (5G), Bluetooth, LAN, and NFC.

In an embodiment, the portable computing device 104 may further be coupled with the remote server 108 over the network 106*a* (shown in FIG. 1). The network can be a wireless network such as cloud network, Wi-Fi, etc. An example of the remote server 108 is the Virtual desktop infrastructure (VDI). In VDI, a hypervisor segments the remote servers 108 into virtual machines that in turn host virtual desktops, which the user 102 may access remotely from the portable computing device 104. The user 102 may access these virtual desktops from any location using the portable computing device 104 and all processing is done on the host server. As such the processor 205 may receive the input from the user 102 through the infrared, or laser augmented reality touchpad sensor 116*b*, the infrared, or laser augmented reality keyboard sensor 118*b* and sends request to the VDI over the network 106*a*. The remote server 108 may then return results based on the request.

Figure 3:
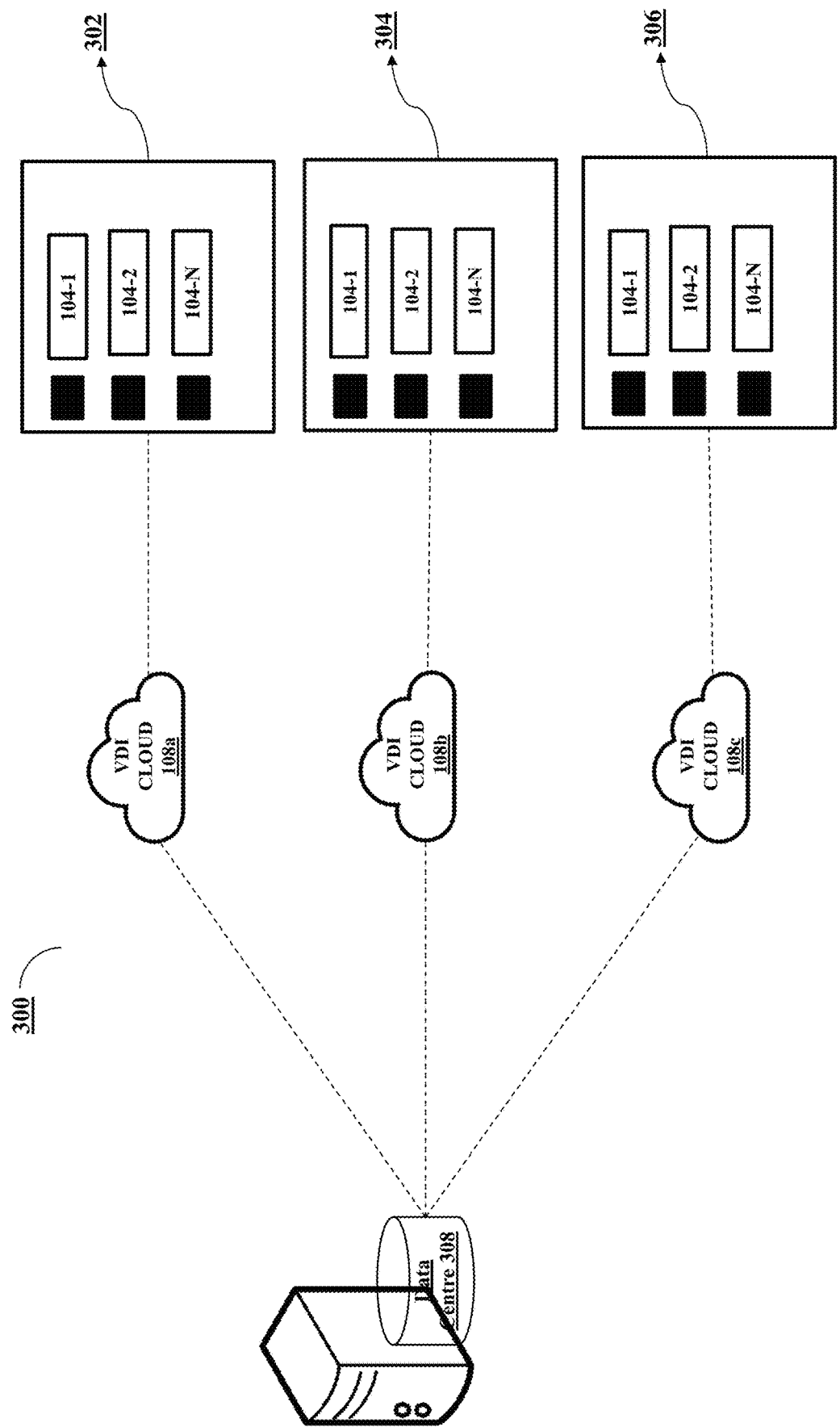
FIG. 3 illustrates an example operation implemented by the portable computing device, in accordance with an embodiment of the present disclosure.

FIG. 3 illustrates an example operation implemented by the portable computing device 104, in accordance with an embodiment of the present disclosure.

In an embodiment, the portable computing device 104 operated by the user 102 may be present in different environments. For instance, a group of the portable computing device 104 in a corporate environment may have different requirements in comparison to a group of the portable computing device 104 in a public domain. As illustrated, a private environment 302 may include 'n' number of the portable computing device 104. In an example, the portable computing device 104 of the private environment 302 may be related to a user-desktop entity. The a user-desktop entity may be indicative of configured specific features and functionality to the user 102 for operating such portable computing device 104. Therefore, each of the portable computing device 104 in the private environment 302 may be connected to a dedicated remote server 108*a* related to the user-desktop entity. Particularly, the remote server 108*a* may provide the VDI specific to the private environment 302. In an example, the user 102 may have personalized login credentials to access a user-profile providing access to the remote server 108*a*. The user-profile establish the connection of the portable computing device 104 in the private environment 302 with the dedicated remote server 108*a*. The user-profile may identify that the portable computing device 104 is the user-desktop entity.

Similarly, an application environment 304 may include 'n' number of the portable computing device 104. In an example, the portable computing device 104 of the application environment 304 may be related to an application-based entity. The application-based entity being indicative of an application installed in the portable computing device 104. Thus, the user 102 may be able to connect to a dedicated remote server 108*b* using the application installed in the portable computing device 104.

Also, a public environment 306 may include 'n' number of the portable computing device 104. In an example, the portable computing device 104 of the public environment 306 may be related to a standard desktop entity. The standard desktop entity being indicative of connecting with a dedicated remote server 108*c*. In the example, the public environment 306 may be referred to as connection with the remote server 108, say the VDI for general purpose without departing from the scope of the present disclosure. The portable computing device 104 of the public environment 306 may establish the connection with the dedicated remote server 108*c* using specific login credentials. The dedicated remote server 108*a*, 108*b*, 108*c* may be connected to a data center 308 for the remote storage, processing, or distribution of large amounts of data. The portable computing device 104 may establish connection with the remote server 108 based on identifying that the portable computing device is one of the application-based entity or the user-desktop entity the a standard desktop entity based on the user-profile.

Figure 4:
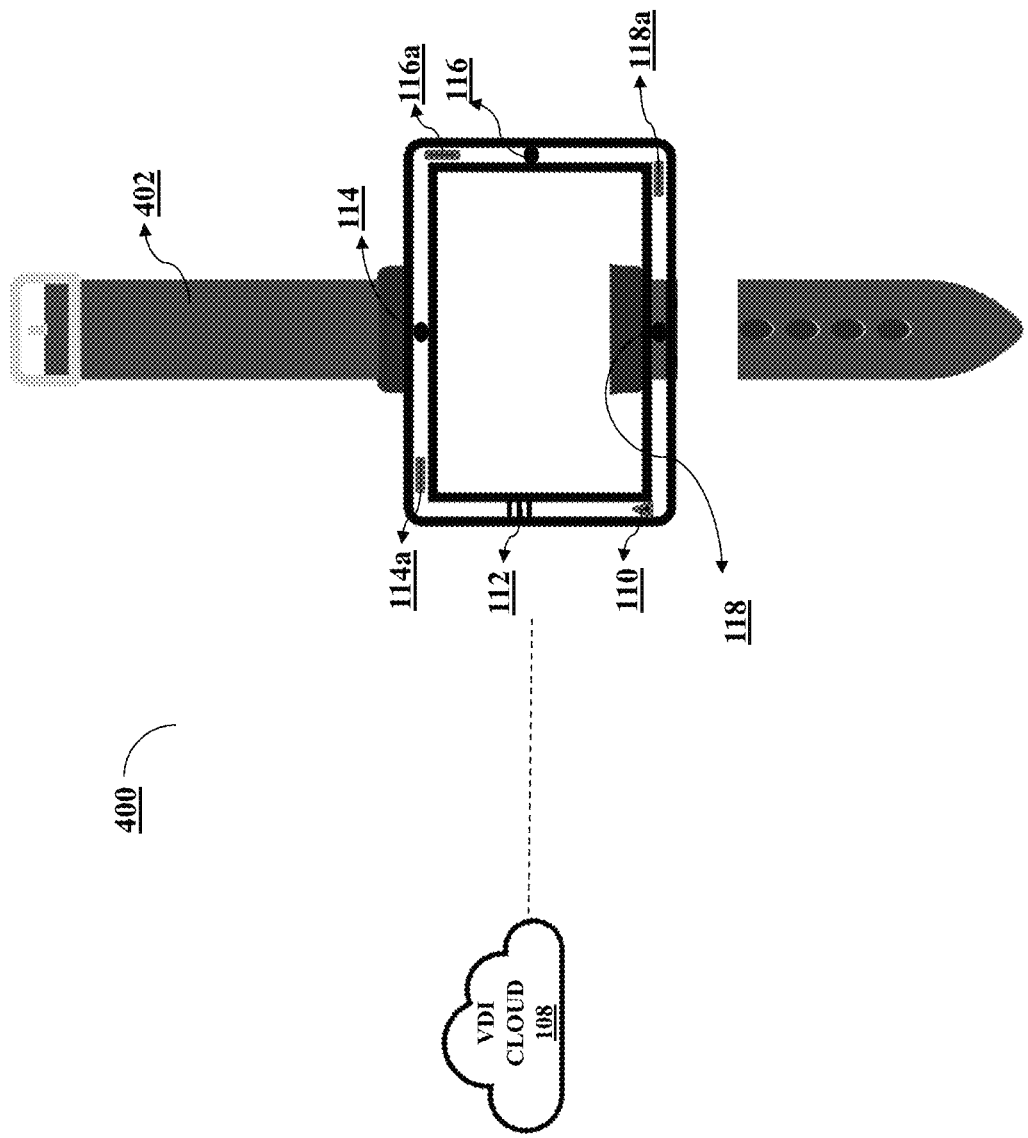
FIG. 4 illustrate a use case depicting the portable computing device as a wearable, in accordance with an embodiment of the present disclosure.

FIG. 4 illustrate a use case depicting the portable computing device 104 as a wearable, in accordance with an embodiment of the present disclosure. In an example, the portable computing device 104 is in form of specially designed wearable watch 400 to be worn by the user 102 on wrist with all the constituent components, as described in FIG. 1. The wearable watch 400 is worn by the user 102 in a manner as normal watches are worn.

Figure 5:
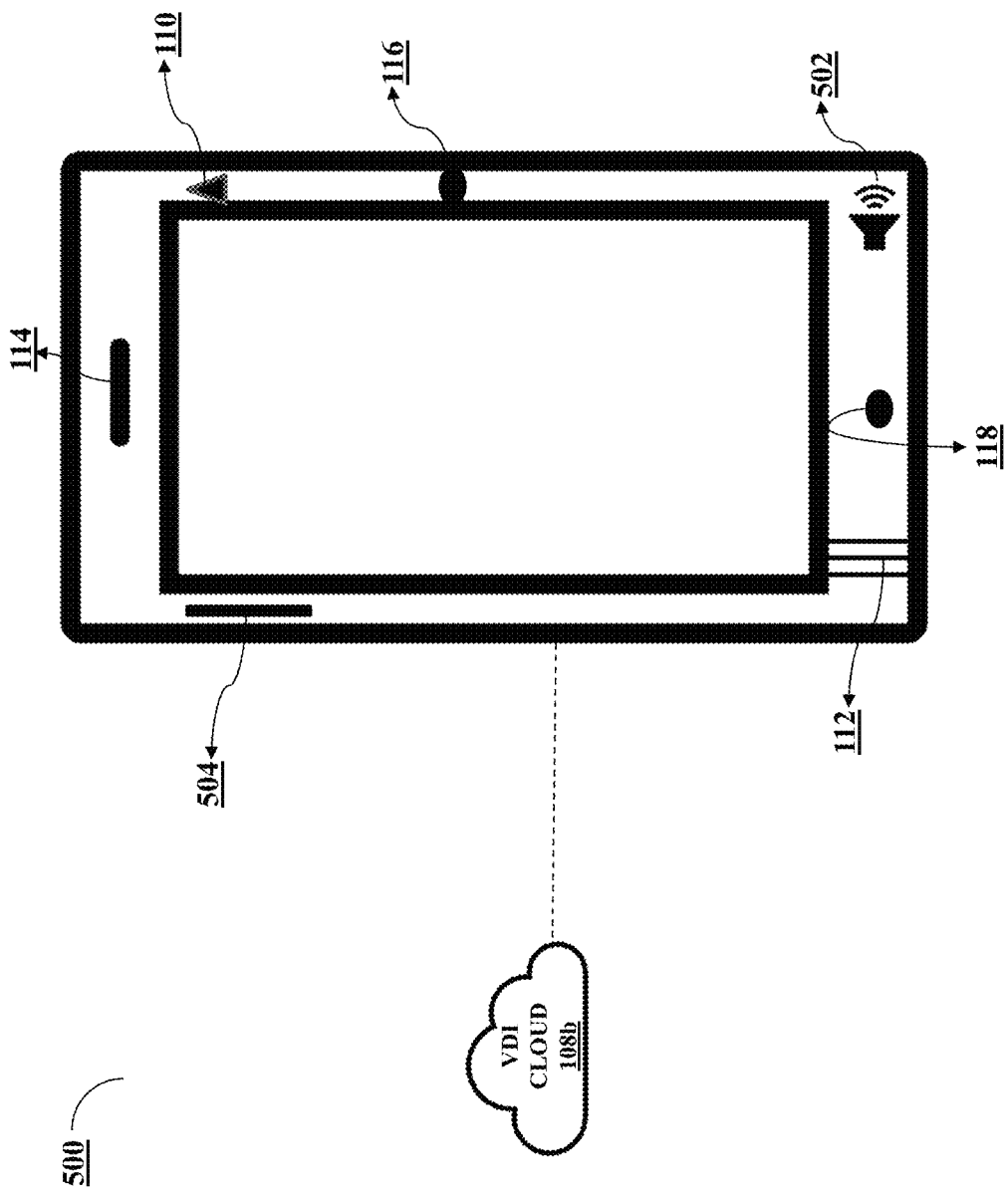
FIG. 5 illustrate another use case depicting the portable computing device as a User Equipment, in accordance with an embodiment of the present disclosure.

FIG. 5 illustrate another use case depicting the portable computing device 104 as a smartphone 500, in accordance with an embodiment of the present disclosure. In an example, the portable computing device 104 is in form of the smartphone 500 to be operated by the user 102 with all the constituent components, as described in FIG. 1. In an example, the portable computing device 104 as the smartphone 500 may include a speaker 502 for providing audio output. The state of the smartphone 500 may be changed between on/off using the switch 504. In an example, the smartphone 500 may be connected to the remote server 108. Particularly, the smartphone 500 is connected to the dedicated remote server 108b (as shown in FIG. 3) relating to the application environment. The smartphone 500 may include the application installed in the smartphone 500. The application may be configured to establish connection with the dedicated remote server 108b say the VDI for the application environment. Thus, the user 102 may be able to use the smartphone 500 to operate the infrared, or laser augmented screen projector 114, the infrared, or laser augmented touch pad sensor projector 116, the infrared, or laser augmented keyboard sensor projector 118 disposed in the housing of the smartphone 500.

Further advantages of the present invention are provided below.

- The user does not have to carry a bulky computer machine.
- The present invention provides a sleek, portable computing machine which is easy to carry, low-cost manufacturing.
- The present invention helps the user to minimize the cost of maintenance of the computer machine peripheral parts.
- In the present invention, functional parts of the computer device is reduced providing more convenience to the user to operate and carry.
- In the present invention, the portable computing device is connected using a VDI id. The VDI may be configured in accordance with the consumer need. This helps a manufacturer of the present invention to have a revenue model using subscription to VDI accordingly.
- In the present invention, internet service providers may host the portable computing device connection to the remote server either as private for corporates users or public for individual users.
- If the portable computing device is damaged or lost or theft, the user may configure its VDI ID on any other new portable computing device without losing any data and without compromising on security threats.
- The present invention shall reduce the personal computer Manufactures Production and shipping cost.
- The present invention shall reduce the supply chain & logistic problems of the multiple functional parts.
- The present invention shall reduce e-waste by 99%. Thus, benefitting the nature.
- The present invention is easy to configure as per user choice.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

I claim:

1. A system for providing augmented reality in a portable computing device, the system comprising:
   a remote server configured to communicate with the portable computing device;
   the portable computing device comprising:
   a plurality of projection sub-systems configured to project at least one input device and at least one output device; and
   a processor in communication with the plurality of projection sub-systems and configured to:
   identify the portable computing device as one of an application-based entity, a user-desktop entity, and a standard desktop entity based on a user-profile accessed on the remote server; and
   establish a connection between the portable computing device and the remote server based on the identification of the portable computing device;
   wherein to communicate with the portable computing device, the remote server is configured to provide a virtual desktop infrastructure (VDI) specific to an environment in which the portable computing device is present, based on the identification of the portable computing device;
   wherein the processor is further configured to:
   determine that the plurality of projection sub-systems has been connected to the remote server; and
   communicate data between the portable computing device and the remote server based on the user-profile, wherein to communicate the data between the portable computing device and the remote server, the processor is configured to:
   receive an input from the at least one input device projected by the plurality of projection sub-systems;
   send a request to the remote server; and
   receive a result for the request from the remote server; and
   at least one switch configured to change an operational state of each of the plurality of projection sub-systems.

2. The system of claim 1, wherein the plurality of projection sub-systems is configured to project the at least one input device and the at least one output device based on one of a laser and an infrared projection, wherein the at least one input device is a keyboard or a mouse, and the at least one output device is a display screen.

3. The system of claim 1, wherein the portable computing device is a wearable device.

4. A portable computing device, comprising:
   a plurality of projection sub-systems configured to project at least one input device and at least one output device;
   a processor in communication with the plurality of projection sub-systems and configured to:
   identify the portable computing device as one of an application-based entity, a user-desktop entity, and a standard desktop entity based on a user-profile accessed on a remote server;
   establish a connection between the portable computing device and the remote server based on the identification of the portable computing device, wherein to establish the connection between the portable computing device and the remote server, the processor is configured to use a virtual desktop infrastructure (VDI) identifier of a VDI provided by the remote server, wherein the VDI provided by the remote server is specific to an environment in which the portable computing device is present;
   determine that one of the plurality of projection sub-systems has been connected to the remote server; and
   communicate data between the portable computing device and the remote server based on the user-profile, wherein to communicate the data between the portable computing device and the remote server, the processor is configured to:
receive an input from the at least one input device projected by the plurality of projection sub-systems;
send a request to the remote server; and
receive a result for the request from the remote server; and
at least one switch configured to change an operational state of each of the plurality of projection sub-systems.

5. The portable computing device of claim 4, wherein the plurality of projection sub-systems is configured to project the at least one input device and the at least one output device based on one of a laser and an infrared projection, wherein the at least one input device is a keyboard or a mouse, and the at least one output device is a display screen.

6. The portable computing device of claim 4, further comprising:
a battery configured to supply power to the processor; and
a charging port to be in communication with the battery and configured to receive external power.

\* \* \* \* \*